US009803589B2

(12) United States Patent
Vuillamy et al.

(10) Patent No.: US 9,803,589 B2
(45) Date of Patent: Oct. 31, 2017

(54) DEVICE FOR HEATING A FLUID

(71) Applicant: SNECMA, Paris (FR)

(72) Inventors: Didier Vuillamy, Quincampoix (FR); Jean-Luc Barthoulot, Panilleuse (FR); Jean-Michel Sannino, Saint Marcel (FR)

(73) Assignee: SNECMA, Paris (FR)

( * ) Notice: Subject to any disclaimer, the term of this patent is extended or adjusted under 35 U.S.C. 154(b) by 736 days.

(21) Appl. No.: 14/349,820

(22) PCT Filed: Oct. 9, 2012

(86) PCT No.: PCT/FR2012/052286
§ 371 (c)(1),
(2) Date: Apr. 4, 2014

(87) PCT Pub. No.: WO2013/054031
PCT Pub. Date: Apr. 18, 2013

(65) Prior Publication Data
US 2014/0245717 A1    Sep. 4, 2014

(30) Foreign Application Priority Data

Oct. 11, 2011 (FR) ..................................... 11 59142

(51) Int. Cl.
*F02K 9/50* (2006.01)
*F23C 6/04* (2006.01)
(Continued)

(52) U.S. Cl.
CPC .................. *F02K 9/50* (2013.01); *F02K 9/60* (2013.01); *F23C 6/04* (2013.01); *F28D 7/00* (2013.01);
(Continued)

(58) Field of Classification Search
CPC ..... F02K 9/42; F02K 9/46; F02K 9/48; F02K 9/50; F02K 9/60; F02K 9/64;
(Continued)

(56) References Cited

U.S. PATENT DOCUMENTS 3,776,303 A * 12/1973 Anderson ................. F28D 7/12
165/158
4,104,869 A * 8/1978 Vincent .................. F01K 19/04
60/39.55
(Continued)

FOREIGN PATENT DOCUMENTS

| DE | 39 03 687 | 8/1989 | |
|---|---|---|---|
| DE | 3903687 A1 * | 8/1989 | ............... F23C 6/04 |
| FR | 2 825 135 | 11/2002 | |

OTHER PUBLICATIONS

International Search Report dated Jan. 3, 2013 in PCT/FR12/52286 filed Sep. 10, 2012.

*Primary Examiner* — Pascal M Bui Pho
*Assistant Examiner* — Marc Amar
(74) *Attorney, Agent, or Firm* — Oblon, McClelland, Maier & Neustadt, L.L.P.

(57) ABSTRACT

A device heating a fluid and usable in a rocket launcher to pressurize a liquefied propellant. The device includes a first burner performing first combustion between a limiting propellant and an excess propellant; a first heat exchanger in which first burnt gas from the first combustion transfers heat to the fluid; at least one second burner into which both the first burnt gas and some limiting propellant are injected to perform second combustion between the limiting propellant and at least a portion of unburnt excess propellant present in the first burnt gas. The second burnt gas from the second combustion flows through a second heat exchanger to transfer heat to the fluid. Burnt gas from each combustion flows in respective burnt gas tubes within a common overall heat (Continued)

exchanger including the heat exchange units, the gas transferring heat to the fluid, the fluid flowing between the burnt gas tubes.

9 Claims, 1 Drawing Sheet

(51) Int. Cl.
| | |
|---|---|
| *F28F 9/22* | (2006.01) |
| *F28D 7/06* | (2006.01) |
| *F28F 1/16* | (2006.01) |
| *F28F 1/36* | (2006.01) |
| *F28D 7/16* | (2006.01) |
| *F02K 9/60* | (2006.01) |
| *F28D 7/00* | (2006.01) |
| *F28D 21/00* | (2006.01) |

(52) U.S. Cl.
CPC ............. *F28D 7/06* (2013.01); *F28D 7/1615* (2013.01); *F28F 1/16* (2013.01); *F28F 1/36* (2013.01); *F28F 9/22* (2013.01); *F23C 2201/40* (2013.01); *F23C 2201/401* (2013.01); *F23C 2900/06041* (2013.01); *F28D 2021/0026* (2013.01)

(58) Field of Classification Search
CPC ........... F28D 20/003; F28D 2021/0022; F28D 2021/0026; F23C 9/069; F23C 2201/20; F23C 2201/401; F23C 2900/06041
USPC .................. 122/18.1, 18.2, 18.3, 18.31, 18.4
See application file for complete search history.

(56) References Cited

U.S. PATENT DOCUMENTS

| | | | | |
|---|---|---|---|---|
| 4,299,192 A | * | 11/1981 | Enga | F23C 13/00 |
| | | | | 122/4 D |
| 4,867,674 A | * | 9/1989 | Keller | F23C 6/04 |
| | | | | 122/44.1 |
| 5,076,590 A | * | 12/1991 | Steinetz | F02K 1/805 |
| | | | | 239/127.1 |
| 2002/0108741 A1 | * | 8/2002 | Jonnalagadda | F28D 7/1646 |
| | | | | 165/159 |
| 2003/0005708 A1 | | 1/2003 | Beck et al. | |
| 2010/0024542 A1 | * | 2/2010 | Yen | F17C 11/005 |
| | | | | 73/290 R |

\* cited by examiner ns wellUS 9,803,589 B2

DEVICE FOR HEATING A FLUID

FIELD OF THE INVENTION

The invention relates to a device for heating a fluid in order to heat a liquefied fluid, in particular in order to vaporize it and to superheat it; the invention also relates to a rocket launcher including such a device.

Such a device may be used in particular for vaporizing a fluid that is it desired to use in gaseous form: the device may typically be used in a rocket launcher for pressurizing a liquid propellant before it is injected into the combustion chamber.

STATE OF THE PRIOR ART

In numerous rocket launchers, the propellants used for propulsion are liquids, typically liquid dihydrogen (LH2) and liquid dioxygen (LO2), and they are therefore stored in the liquid state in tanks. In such launchers, the tanks for the liquefied propellants are normally depressurized during stages of ballistic flight; nevertheless if the thruster is to be restarted after such a ballistic stage, the liquid propellant tanks need to be repressurized in order for the pressure of the propellant to comply with conditions for feeding the engine.

In order to perform such pressurization, it is advantageous to use autogenous pressure obtained by extracting and gasifying a portion of each of propellant, which portion is reinjected in gaseous form into the top of the corresponding tank. This autogenous pressure serves to avoid providing specific pressurization devices, typically a tank of gaseous helium under high pressure, thereby reducing payload mass.

For this purpose, it is common practice to cause a liquefied propellant to pass through a heat exchanger that is also fed with hot gas by a burner performing combustion between two propellants, typically the two propellants that are also used for propulsion. Nevertheless, since such combustion is highly exothermic, it is not possible to perform it under stoichiometric conditions, since the combustion would release too much heat leading to temperatures that are too high, and thus damaging the materials of the burner or of the heat exchanger.

The usual method therefore makes use of mixing ratios that are far from such stoichiometric conditions: the temperatures that are reached can thus be withstood by the materials, but a large fraction of one of the propellants used remains unburnt and is lost in the gas coming from the combustion. The efficiency of such a method is therefore rather low: a significant amount of payload propellant thus ends up being lost. Given the constraints in terms of weight and volume for such a launcher, it can be understood that such a method is not satisfactory.

There therefore exists a real need for a device for gasifying a fluid and that does not suffer from the drawbacks inherent to the above-described known device.

SUMMARY OF THE INVENTION

The present invention relates to a device for heating a fluid, the device comprising a first burner performing first combustion between a limiting propellant and an excess propellant, a first heat exchange unit in which first burnt gas from said first combustion transfers heat to the fluid, and at least one second burner into which both the first burnt gas and some limiting propellant are injected in order to perform second combustion between the limiting propellant and at least a portion of the unburnt excess propellant present in the first burnt gas, in which the second burnt gas from said second combustion flows through a second heat exchange unit in order to transfer heat to the fluid. The burnt gas from each of the combustions flows in respective burnt gas tubes within a common overall heat exchanger made up of said heat exchange units and in which the gas transfers heat to the fluid, the fluid flowing between the burnt gas tubes.

In this way, even though the first combustion is not performed under stoichiometric conditions, and thus even though unburnt excess propellant is present in the first burnt gas, it is possible to consume some of this unburnt propellant in the second burner unit by performing combustion with the limiting propellant; the amount of the propellant in excess that is lost is therefore reduced correspondingly.

It is possible to perform this second combustion since the first burnt gas has transferred heat to the fluid in the first heat exchange unit and has therefore been cooled. It is then possible to heat it up again in the second burner unit, e.g. up to the same outlet temperature as the first burner unit.

The overall efficiency of the device is thus improved since less of the excess propellant is lost at the end of the second combustion. For a constant quantity of heat production, less propellant is therefore consumed, thereby constituting a direct economic saving, and reducing the payload of propellant, thereby reducing its storage volume and above all reducing payload mass, thus achieving a significant indirect economic saving.

Furthermore, for given quantity of heat needed for vaporizing and superheating the fluid, it is possible to share this heat production between two burners. This makes it possible in particular to adjust the successive combustions so as to obtain temperatures that are less stressful for the materials. This may also make it possible to reduce the size and thus the mass of each burner. Even if the total mass of the device is increased, this increase is compensated by the above-mentioned saving in propellant mass.

The present description relates mainly to a use for vaporizing and possibly superheating a fluid that is initially in the liquid state: naturally, the present invention also applies to uses in which critical thermodynamic conditions are exceeded and thus in which the fluid is in the supercritical state without it being possible to observe vaporization while it is being heated. It then suffices to understand that the present invention serves to heat the fluid up to the desired utilization temperature.

In certain embodiments, the device comprises a plurality of burners: into each burner of number n from the second, the $(n-1)^{th}$ burnt gas from the $(n-1)^{th}$ combustion is injected together with some limiting propellant in order to perform $n^{th}$ combustion between the limiting propellant and at least a portion of the unburnt excess propellant present in the $(n-1)^{th}$ burnt gas; the $n^{th}$ burnt gas from said $n^{th}$ combustion flows through an $n^{th}$ heat exchange unit to transfer heat to the fluid. These burners are arranged in series, thus making it possible in each burner to consume a portion of the excess propellant that was not burnt by the preceding combustion, and thus, overall, correspondingly stoichiometric to approach conditions that provide the best efficiency. This also makes it possible to distribute the production of heat over a plurality of combustions and therefore to optimize each of these combustions better. All of the above-mentioned advantages are thus amplified.

In certain embodiments, the mixing ratio of each combustion is adjusted in such a manner that the resulting temperature in the device does not exceed a maximum temperature imposed by the heat-resistance of the materials of the device. This maximum temperature may be approached while leaving a certain safety margin. This makes it possible to produce as much heat as possible without damaging the materials of the device, and in particular of the burner and the heat exchanger. This maximum temperature is typically about 900° C.

In certain embodiments, the number of burners and the quantities of limiting propellant and of excess propellant injected into the burners are such that the excess propellant is substantially completely burnt after the last combustion. In this way, for the device as a whole, stoichiometric conditions are achieved, and thus maximum efficiency is achieved.

In certain embodiments, apart from the $(n-1)^{th}$ burnt gas, only limiting propellant is injected into the $n^{th}$ burner: no new excess propellant is injected. Thus, the excess propellant is injected once only into the first burner, thereby simplifying the circuit for delivering the excess propellant.

In certain embodiments, the device has five or six burners. The ideal number of burners is the result of a compromise between the savings made possible by additional combustion, and thus higher efficiency and smaller propellant payload mass, and the drawbacks in terms of the mass and the complexity involved with each additional burner. The compromise depends in particular on the maximum temperature that can be accepted by the materials.

In certain embodiments, the fluid is a liquefied propellant for vaporizing and for superheating. This applies in particular for a rocket launcher in which the vaporized propellant is used for pressurizing the liquefied propellant tank.

In certain embodiments, the propellant for pressurizing is the same substance as one of the limiting or excess propellants. In this way, only two different propellants are needed, thereby greatly simplifying the arrangements for storage and distribution.

In certain embodiments, the limiting propellant is dioxygen and the excess propellant is dihydrogen. These propellants are in widespread use in the aerospace field and they are highly reactive.

In certain embodiments, the mixing ratio, by weight, between the dioxygen and the dihydrogen is equal to unity in the first burner. The mixing ratio may reach eight over all of the burners, which corresponds to the stoichiometric ratio for the reaction:

$$2H_2+O_2=2H_2O$$

In certain embodiments, the burnt gas tubes are of circular or rectangular section.

In certain embodiments, the burners are in alignment along one side of the overall heat exchanger and the burnt gas flows from one burner to another by passing through the overall heat exchanger in U-shaped burnt gas tubes. This makes it easier to put the burners and their feed and control circuits into place.

In certain embodiments, the overall heat exchanger is a shell-and-tube heat exchanger presenting partitions. These partitions define a flow passage for the fluid that extends in three dimensions, thereby lengthening the path traveled by the fluid in contact with the burnt gas tubes, and thus increasing exchanges of heat.

In certain embodiments, the overall heat exchanger has heat exchange members at the interface between the burnt gas and the fluid. This makes it possible to increase the heat exchange surface areas.

In certain embodiments, the heat exchange members are helical fins arranged around and/or inside the burnt gas tubes. These fins not only increase the heat exchange surface areas, but they also force the fluid to turn around the burnt gas tubes, thereby further increasing exchanges of heat.

In other embodiments, these heat exchange members are radial fins arranged around and/or inside the burnt gas tubes.

In other embodiments, these heat exchange members are rings arranged around and/or inside the burnt gas tubes.

In certain embodiments, the section of the burnt gas tubes and/or the section of the fluid passage vary. They may thus be configured to take account of variations in the density or the mass flow rate and to compensate for head losses.

In certain embodiments, the overall heat exchanger is made up of two half-casings that are assembled together and provided with seals. These two half-casings may be assembled together so that they contain all of the burnt gas tubes. This embodiment is particularly simple to assemble.

In certain embodiments, the burnt gas and the fluid flow as countercurrent flows in the overall heat exchanger.

In other embodiments, they flow as concurrent flows in the overall heat exchanger.

In other embodiments, certain sections of the overall heat exchanger have concurrent flows, while others have countercurrent flows.

In certain embodiments, the burners use injectors and spark-plug ignition in an arrangement similar to that used in a car. Any other kind of injection and ignition may be used.

The invention also provides a rocket launcher including a device for heating a fluid in accordance with the invention.

The above-mentioned characteristics and advantages, and others, appear on reading the following detailed description of embodiments of the proposed device. This detailed description is made with reference to the accompanying drawing.

BRIEF DESCRIPTION OF THE DRAWING

The accompanying drawing is diagrammatic and seeks above all to illustrate the principles of the invention.

In the drawing, from one figure to another, elements (or portions of elements) that are identical are referenced using the same reference signs.

DETAILED DESCRIPTION OF EMBODIMENTS

In order to make the invention more concrete, an example device is described below in detail with reference to the accompanying drawing. It should be understood that the invention is not limited to this example.

Figure 1:
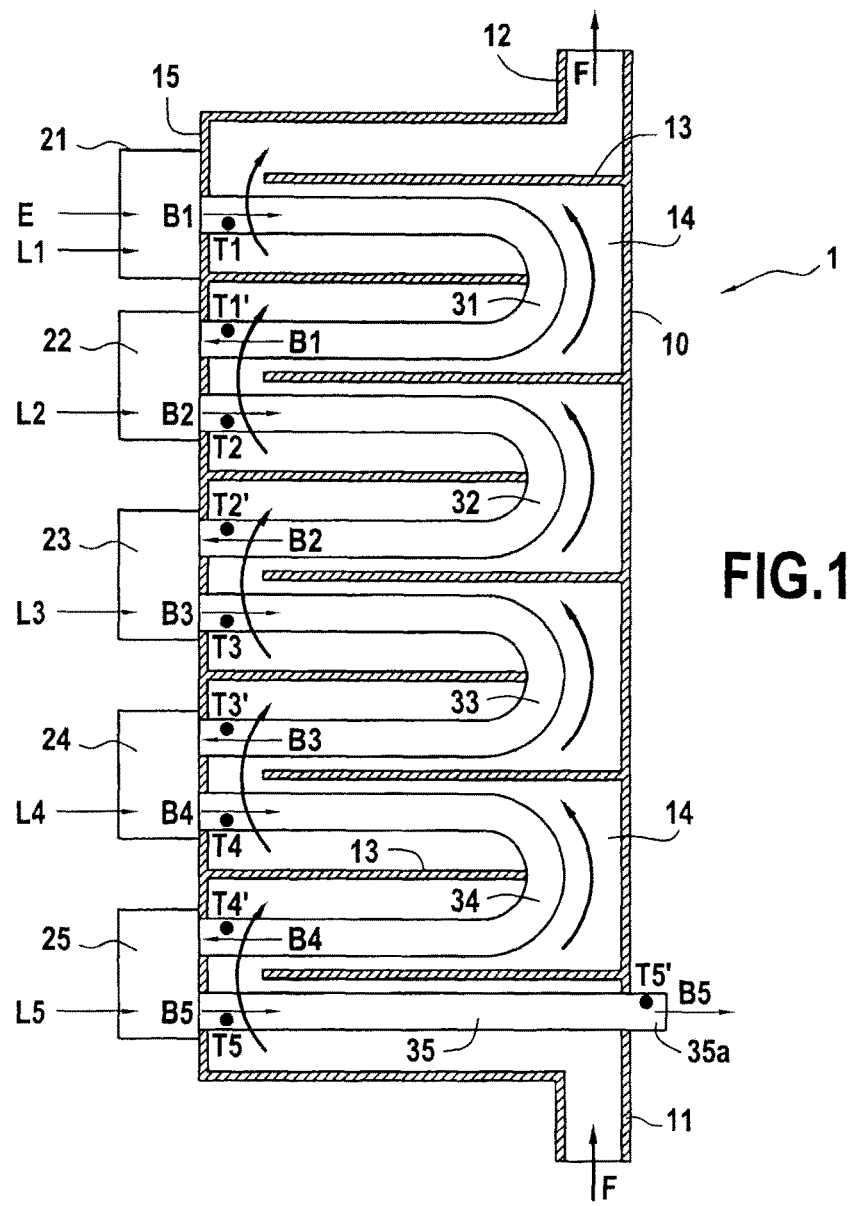
FIG. 1 is a diagrammatic section view of the device.

FIG. 1 is a diagrammatic section view of the device 1. The device 1 comprises an overall heat exchanger 10, a first burner 21, and four other burners 22, 23, 24, and 25.

The overall heat exchanger 10 has an inlet orifice 11, an outlet orifice 12, and a plurality of internal partitions 13. The fluid F for vaporizing penetrates into the overall heat exchanger 10 via the inlet orifice 11, flows along the passage 14 defined by the partitions 13, and leaves the overall heat exchanger 10 via the outlet orifice 12. The array of partitions 13 may be oriented in three dimensions so as to force the fluid F to travel along a longer path in the passage 14 between the inlet orifice 11 and the outlet orifice 12. Both arrows in FIG. 1 show the path followed by the fluid F in the passage 14 of the overall heat exchanger 10.

The first burner 21 is arranged against or in the vicinity of a first side 15 of the overall heat exchanger 10. The first burner 21 is fed with excess propellant E, typically dihydrogen H2, and a limiting propellant L (flow L1), typically dioxygen O2. Combustion of the excess propellant E with the limiting propellant L in the first burner 21 generates first burnt gas B1 that is sent into a first burnt gas tube 31. This tube 31 lies within the passage 14 of the overall heat exchanger 10 in the proximity of the outlet orifice 12. It is U-shaped and returns towards the first side 15 of the overall heat exchanger 10 so as to deliver into the second burner 22.

In this embodiment, the first tube 31 and the partitions 13 are arranged in such a manner that the first burnt gas B1 and the fluid F flow in countercurrent flows.

The mixing ratio of the first combustion in the first burner 21 is adjusted so that the temperature T1 of the first burnt gas B1 at the outlet from the first burner 21 is less than the maximum acceptable temperature for the materials of the device 1. This mixing ratio is not stoichiometric: there remains excess propellant E in the first burnt gas B1.

The first burnt gas B1 flowing in the first burnt gas tube 31 transfers heat to the fluid F in order to enable it to evaporate and be superheated. The first burnt gas B1 therefore cools down and penetrates into the second burner 22 at a temperature T1' that is lower than its temperature T1 from the outlet from the first burner 21.

The second burner 22 is likewise arranged against or in the vicinity of the first side 15 of the overall heat exchanger 10. It is situated in the proximity of the first burner 21. This second burner 22 is fed with the first burnt gas B1 and with the limiting propellant L (flow L2). The combustion of the limiting propellant L with the residual excess propellant E present in the first burnt gas B1 generates second burnt gas B2 that is sent into a second burnt gas tube 32. This second tube 32, similar to the tube 31, is arranged within the passage 14 of the overall heat exchanger 10, upflow from the first burnt gas tube 31, and it returns to the first side 15 of the overall heat exchanger 10 so as to deliver into the third burner 23.

The mixing ratio of the second combustion in the second burner 22 is likewise adjusted in such a manner that, given the temperature T1' of the first burnt gas B1 at the inlet to the second burner 22, the temperature T2 of the second burnt gas B2 at the outlet from the second burner 22 is less than the maximum temperature that is acceptable for the materials of the device 1. This mixing ratio is not stoichiometric: there still remains excess propellant E in the second burnt gas B2.

The second burnt gas B2 flows along the second burnt gas tube 32 and transfers heat to the fluid F in order to allow it to evaporate. The second burnt gas B2 is thus cooled and penetrates into the third burner 23 at a temperature T2' that is lower than its temperature at the outlet T2 from the second burner 22.

The third and fourth burners 23 and 24, associated with respective third and fourth burnt gas tubes 33 and 34 are similar, and they operate in the same way and for the same purposes as the second burner 22 and the second burnt gas tube 32, since there still remains excess propellant E in the burnt gas.

The fifth and last burner 25 is arranged against or in the vicinity of the first side 15 of the overall heat exchanger 10. It is situated in the vicinity of the fourth burner 24, in alignment with the other burners. It is fed with the fourth burnt gas B4 and with the limiting propellant L (flow L5). The combustion of the limiting propellant L with the residual excess propellant E present in the fourth burnt gas B4 generates fifth burnt gas B5 that is sent into a fifth burnt gas tube 35. This fifth tube 35 is not necessarily U-shaped: it is arranged within the passage 14 of the overall heat exchanger 10, upflow from the fourth burnt gas tube 34 and in the proximity of the inlet orifice 11 of the overall heat exchanger 10. Thereafter it leaves the overall heat exchanger 10 and releases the fifth burnt gas B5 via a release orifice 35a.

Given the temperature T4' of the fourth burnt gas at the inlet to the fifth burner 25, and the small residual quantity of excess propellant E in the fourth gas burnt B4, it is possible to adjust the mixing ratio of the fifth combustion in the fifth burner 25 in stoichiometric manner without exceeding the maximum acceptable temperature for the materials of the device 1. The limiting and excess propellants L and E are thus burnt completely: there is no longer any excess propellant in the fifth burnt gas B5.

The fifth burnt gas B5 flows along the fifth burnt gas tube 35 and transfers heat to the fluid F in order to enable it to evaporate. The fifth burnt gas B5 thus cools and leaves the overall heat exchanger 10 and the device 1 via the release orifice 35a. It may be subjected to some special use in another portion of the launcher; in particular, advantage may be taken of its impulse or of its residual temperature.

Figure 2:
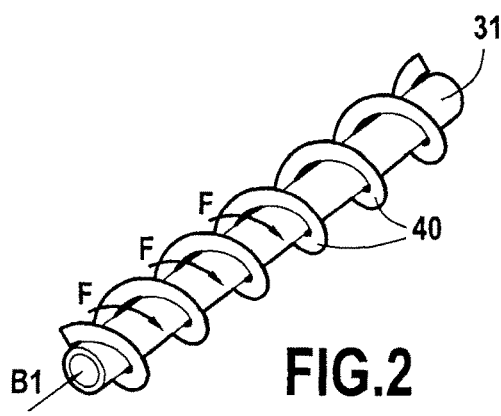
FIG. 2 is a diagrammatic view of a tube for burnt gas, which tube is provided with helical fins.

FIG. 2 shows an embodiment of a heat exchange member that may be installed on the burnt gas tubes 31 to 35 as described above. A helical fin 40 is thus arranged around a burnt gas tube 31. The helical fin 40 increases the heat exchange area between the burnt gas B1 and the fluid F for vaporizing. Furthermore, it causes the fluid F to rotate around the tube 31, thereby increasing the length of the path traveled in contact therewith. The burnt gas tubes 31 to 35 may be provided with such helical fins 40 over their entire lengths, or over only portions thereof.

Figure 3:
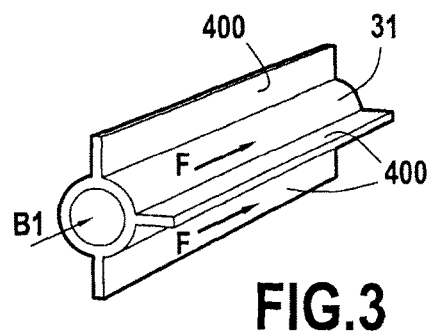
FIG. 3 is a diagrammatic view of a tube for burnt gas, which tube is provided with radial fins.

FIG. 3 shows another embodiment of a heat exchange member that may be installed on the above-described burnt gas tubes 31 to 35. Radial fins 400 are thus arranged along a burnt gas tube 31. These radial fins 400 increase the heat exchange area between burnt gas B1 and the fluid air for vaporizing. An arbitrary number of fins 400 may be arranged around a given tube 31: they may optionally be regularly arranged angularly. The burnt gas tubes 31 to 35 may be provided with such radial fins 400 over their entire lengths, or over only portions thereof. It is possible for some of the tubes 31 to 35 to be fitted with helical fins 40 and other tubes 31 to 35 to be fitted with radial fins 400.

The embodiments or implementations described above in the present description are given as non-limiting illustrations, and in the light of this description, a person skilled in the art can easily modify these embodiments or implementations, or can envisage others, while remaining within the scope of the invention.

Furthermore, the various characteristics of these embodiments or implementations may be used singly or they may be combined with one another. When they are combined, the characteristics may be combined as described above or in other ways, the invention not being limited to the specific combinations described in the present description. In particular, unless specified to the contrary, a characteristic described with reference to one particular embodiment or implementation may be applied in analogous manner to some other embodiment or implementation.

The invention claimed is:

1. A device for heating a fluid, the device comprising:
    a common overall heat exchanger comprising a passage for the fluid a first burner of a plurality of burners performing first combustion between a limiting propellant and an excess propellant;

a first heat exchange unit, provided within the overall heat exchanger, in which first burnt gas from the first combustion transfers heat to the fluid; and a second burner of the plurality of burners into which both the first burnt gas and the limiting propellant are injected to perform second combustion between the limiting propellant and at least a portion of unburnt excess propellant present in the first burnt gas;

wherein second burnt gas from the second combustion flows through a second heat exchange unit, provided within the overall heat exchanger, to transfer heat to the fluid; and wherein the burnt gas from each of the combustions flows in respective burnt gas tubes lying within the passage of the common overall heat exchanger, and in which the gas transfers heat to the fluid, the fluid flowing between the burnt gas tubes in the passage, and wherein the passage is formed radially surrounding the respective burnt gas tubes along the length of the passage.

2. The device for heating a fluid according to claim 1, comprising the plurality of burners; wherein, into each burner of number n starting from a second, a $(n-1)^{th}$ burnt gas from a $(n-1)^{th}$ combustion is injected together with some limiting propellant to perform $n^{th}$ combustion between the limiting propellant and at least a portion of the unburnt excess propellant present in the $(n-1)^{th}$ burnt gas; and wherein the $n^{th}$ burnt gas from the $n^{th}$ combustion flows through an $n^{th}$ heat exchange unit to transfer heat to the fluid.

3. The device for heating a fluid according to claim 1, wherein a mixing ratio of each combustion is adjusted such that a temperature that results in the device does not exceed a maximum temperature imposed by heat resistance of materials of the device.

4. The device for heating a fluid according to claim 1, wherein a number of burners of the plurality of burners and quantities of limiting propellant and of excess propellant injected into the burners are such that excess propellant is substantially completely burnt after a last combustion.

5. The device for heating a fluid according to claim 1, wherein the burners are in alignment along one side of the overall heat exchanger and the burnt gas flows from one burner to another by passing through the heat exchanger in the respective burnt gas tubes, said burnt gas tubes being U shaped.

6. The device for heating a fluid according to claim 1, wherein the overall heat exchanger includes heat exchange members at an interface between the burnt gas and the fluid.

7. The device for heating a fluid according to claim 6, wherein the heat exchange members are helical fins arranged around and/or inside the burnt gas tubes.

8. The device for heating a fluid according to claim 1, wherein the overall heat exchanger includes two half casings that are assembled together and provided with seals.

9. A rocket launcher, comprising the device for heating a fluid according to claim 1.

* * * * *